United States Patent
Yoshioka et al.

(10) Patent No.: US 12,108,366 B2
(45) Date of Patent: Oct. 1, 2024

(54) TERMINAL AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP); Yanru Wang, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 327 days.

(21) Appl. No.: 17/632,098

(22) PCT Filed: Aug. 15, 2019

(86) PCT No.: PCT/JP2019/032084
§ 371 (c)(1),
(2) Date: Feb. 1, 2022

(87) PCT Pub. No.: WO2021/029083
PCT Pub. Date: Feb. 18, 2021

(65) Prior Publication Data
US 2022/0279484 A1 Sep. 1, 2022

(51) Int. Cl.
*H04W 72/02* (2009.01)
*H04L 1/08* (2006.01)
*H04L 5/00* (2006.01)
*H04W 72/1263* (2023.01)

(52) U.S. Cl.
CPC ............. *H04W 72/02* (2013.01); *H04L 1/08* (2013.01); *H04L 5/0053* (2013.01); *H04W 72/1263* (2013.01)

(58) Field of Classification Search
CPC ...... H04L 1/08; H04L 5/0053; H04L 72/1263
USPC ......................... 370/329, 401, 395
See application file for complete search history.

(56) References Cited

U.S. PATENT DOCUMENTS

2021/0377980 A1* 12/2021 Fujishiro ............... H04W 36/08

FOREIGN PATENT DOCUMENTS

EP 3985900 A1 4/2022

OTHER PUBLICATIONS

Extended European Search Report issued in counterpart European Patent Application No. 19941258.6, mailed on Mar. 20, 2023 (12 pages).

(Continued)

*Primary Examiner* — Dang T Ton
(74) *Attorney, Agent, or Firm* — Osha Bergman Watanabe & Burton LLP

(57) ABSTRACT

A terminal includes a reception unit configured to receive information for scheduling a resource used in terminal-to-terminal direct communication, from a base station; and a transmission unit configured to transmit a signal to another terminal, by using the resource. The reception unit is configured to receive, from the another terminal, a response related to a retransmission control corresponding to the signal. The terminal further includes a control unit configured to select either of information including a positive response or information including a negative response, based on the response related to the retransmission control. The transmission unit is configured to transmit the selected information to the base station.

3 Claims, 9 Drawing Sheets

(56) References Cited

OTHER PUBLICATIONS

Samsung; "Considerations on Sidelink HARQ Procedure"; 3GPP TSG RAN WG1 #96, R1-1902278; Athens, Greece; Feb. 25-Mar. 1, 2019 (11 pages).
Ericsson; "Mode-1 Implications for Supporting SL HARQ feedbacks"; 3GPP TSG-RAN WG2 #105, TDoc R2-1901651; Athens, Greece; Feb. 25-Mar. 1, 2019 (5 pages).
3GPP TR 22.886 V15.1.0 "3rd Generation Partnership Project; Technical Specification Group Services and System Aspects; Study on enhancement of 3GPP Support for 5G V2X Services (Release 15)" Mar. 2017 (58 pages).
3GPP TS 36.211 V15.6.0 "3rd Generation Partnership Project; Technical Specification Group Radio Access Network; Evolved Universal Terrestrial Radio Access (E-UTRA); Physical channels and modulation (Release 15)" Jun. 2019 (239 pages).
3GPP TSG RAN WG1 Ad-Hoc Meeting 1901; R1-1900405 "Discussion on HARQ feedback" CMCC; Taipei; Jan. 21-25, 2019 (4 pages).
3GPP TSG RAN WG1 Ad-Hoc Meeting 1901; R1-1901052 "Considerations on Sidelink HARQ Procedure" Samsung; Taipei, Taiwan; Jan. 21-25, 2019 (8 pages).
3GPP TSG RAN WG1 Meeting #96; R1-1901993 "Discussion on physical layer procedures in NR V2X" CATT; Athens, Greece; Feb. 25-Mar. 1, 2019 (9 pages).
3GPP TSG-RAN WG2 Meeting #105bis; R2-1904805 "Sidelink HARQ Configuration" Samsung; Xi'an, China; Apr. 8-12, 2019 (2 pages).
International Search Report issued in International Application No. PCT/JP2019/032084, mailed Mar. 10, 2020 (3 pages).
Written Opinion issued in International Application No. PCT/JP2019/032084; Dated Mar. 10, 2020 (5 pages).
Office Action issued in Japanese Application No. 2021-539807 dated Jun. 6, 2023 (6 pages).
Office Action issued in counterpart Japanese Patent Application No. 2021-539807 mailed on Sep. 12, 2023 (6 pages).
Office Action issued in counterpart Canadian Patent Application No. 3,148,851 mailed on Jan. 19, 2024 (4 pages).

* cited by examiner

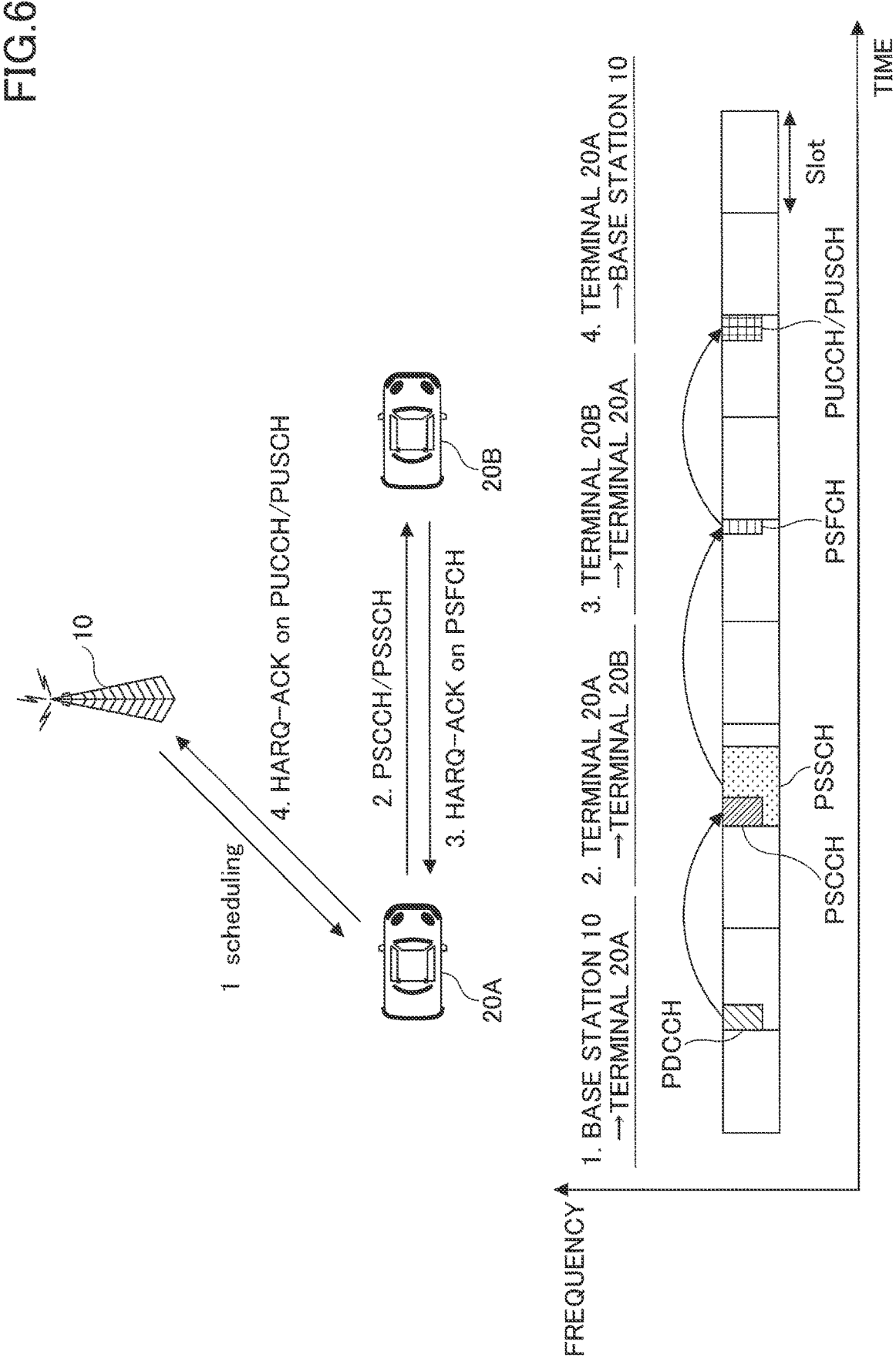

TERMINAL AND COMMUNICATION METHOD

TECHNICAL FIELD

The present invention relates to a terminal in a wireless communication system, and a communication method.

BACKGROUND ART

In long term evolution (LTE) and LTE successor systems (e.g., LTE-A (LTE Advanced) and new radio (NR) (which may be referred to as 5G)), device to device (D2D) technologies in which terminals directly communicate with each other without using a base station are discussed (for example, Non-Patent document 1).

The D2D reduces traffic between the terminal and the base station, and enables communications between terminals even if the base station is unable to perform communications in the event of a disaster, etc. Note that in 3rd generation partnership project (3GPP), the D2D is referred to as "sidelink", but the more common term "D2D" will be used in the specification. In the following embodiment, "sidelink" may be also used as necessary.

The D2D communication is classified as D2D discovery (which is also referred to as "D2D discovery") for discovering another terminal capable of communication, and D2D communication (which is also referred to as D2D direct communication, D2D communication, terminal-to-terminal direct communication, or the like) for directly communicating between terminals. In the following, when the D2D communication, the D2D discovery, and the like are not distinguished particularly, they are simply called D2D. Also, a signal to be transmitted or received using the D2D is referred to as a D2D signal. Various use cases of services used in vehicle to everything (V2X) in NR are discussed (for example, Non-Patent document 2).

CITATION LIST

Non-Patent document 1: 3GPP TS 36.211 V15.6.0 (2019-06)
Non-Patent document 2: 3GPP TR 22.886 V15.1.0 (2017-03)

SUMMARY

Technical Problem

In the terminal-to-terminal direct communication in NR-V2X, a support for a hybrid automatic repeat request (HARQ) control is discussed. On the other hand, a method of transmitting, from a terminal that performs transmission in the terminal-to-terminal direct communication, information on a HARQ response in the terminal-to-terminal direct communication, to a base station, is not clearly defined.

In view of the point described above, an object of the present invention is to suitably perform a retransmission control in terminal-to-terminal direct communication.

Solution to Problem

According to disclosed techniques, a terminal is provided, including a reception unit configured to receive information for scheduling a resource used in terminal-to-terminal direct communication, from a base station; and a transmission unit configured to transmit a signal to another terminal, by using the resource. The reception unit is configured to receive, from the another terminal, a response related to a retransmission control corresponding to the signal, and the terminal further includes a control unit configured to select either of information including a positive response or information including a negative response, based on the response related to the retransmission control. The transmission unit is configured to transmit the selected information to the base station.

Advantageous Effects of Invention

According to the disclosed techniques, a retransmission control can be suitably performed in terminal-to-terminal direct communication.

BRIEF DESCRIPTION OF DRAWINGS

FIG. 6 is a diagram for explaining an example of communication according to the embodiment of the present invention.

DESCRIPTION OF EMBODIMENTS

An embodiment of the present invention will be hereinafter described with reference to the drawings. Note that the embodiment described below is merely an example, and the embodiment to which the present invention applies is not limited to the embodiment below.

In operating a wireless communication system according to the embodiment of the present invention, existing techniques are used as appropriate. The existing techniques include, for example, existing LTE, but are not limited to the existing LTE. The term "LTE" used in the specification broadly means LTE-Advanced and systems (e.g., NR) used after LTE-Advanced; or a wireless local area network (LAN), unless otherwise stated.

In the embodiment of the present invention, a duplex system may include a time division duplex (TDD) system, a frequency division duplex (FDD) system, or other systems (e.g., flexible duplex, or the like).

In the embodiment of the present invention, "configure" used for a wireless parameter or the like may mean that a predetermined value is pre-configured, or that a wireless parameter indicated by a base station 10 or a terminal 20 is configured.

Figure 1:
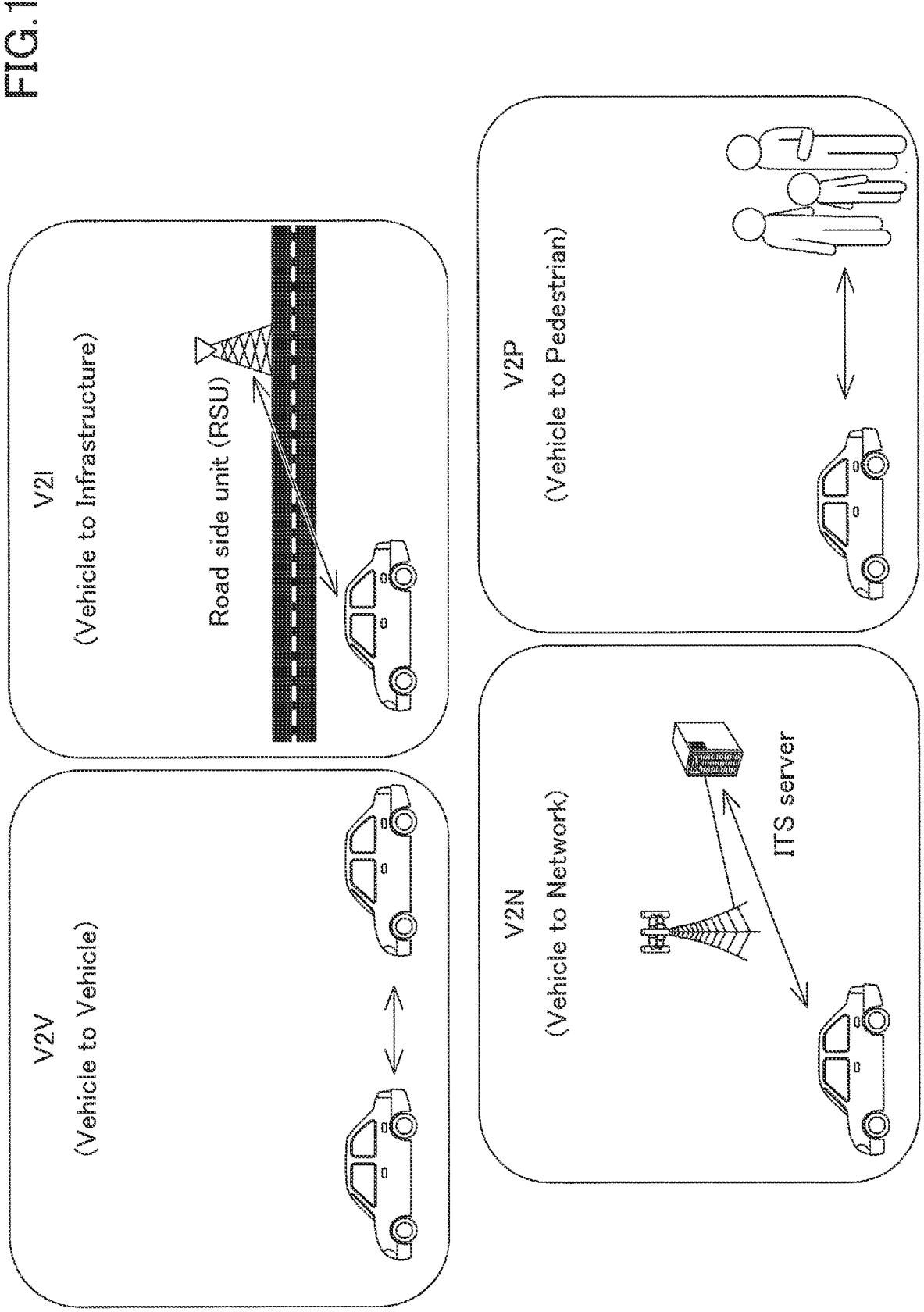
FIG. 1 is a diagram for explaining V2X.

FIG. 1 is a diagram for explaining V2X. In 3GPP, by extending a D2D function, implementation of vehicle to everything (V2X) or enhanced V2X (eV2X) is reviewed, and their specifications are discussed. As illustrated in FIG. 1, V2X is a part of intelligent transport systems (ITS), and is a generic term of vehicle to vehicle (V2V) meaning a manner of communication performed between vehicles; vehicle to infrastructure (V2I) meaning a manner of communication performed between a vehicle and a road-side unit (RSU) installed on a road side; vehicle to network (V2N) meaning a manner of communication performed between a vehicle and an ITS server; and vehicle to pedestrian (V2P) meaning a manner of communication performed between a vehicle and a mobile terminal carried by a pedestrian.

In 3GPP, V2X using cellular communication and inter-terminal communication in LTE or NR is studied. V2X using cellular communication is also referred to as cellular V2X. In V2X in NR, studies for allowing large capacity, low delay, and high reliability, and a quality of service (QoS) control are boosted.

For V2X in LTE or NR, discussions that are not limited to 3GPP technical specification development are expected in a future. For example, securing of interoperability; cost reduction by implementing an upper layer; a method of combining or switching of a plurality of radio access technologies (RATs); regulation actions in each country; and data acquisition for a V2X platform in LTE or NR; delivery; database management; and a use method, are expected to be discussed.

In the embodiment of the present invention, a case is mainly assumed in which a communication device is installed on a vehicle, but the embodiment of the present invention is not limited to such a case. For example, the communication device may be a terminal carried by a person, or the communication device may be a device provided in a drone or an aircraft. The communication device may include a base station, an RSU, a relay station (relay node), a terminal having a scheduling capability, or the like.

Note that sidelink (SL) may be distinguished from uplink (UL) or downlink (DL), based on one of the following 1) to 4) or a combination thereof. Further, SL may be referred to by another name.

1) Resource arrangement in a time domain
2) Resource arrangement in a frequency domain
3) Synchronization signal to be referred to (including a sidelink synchronization signal (SLSS))
4) Reference signal used in path loss measurement for a transmission power control Further, for orthogonal frequency division multiplexing (OFDM) in SL or UL, any from among cyclic-prefix OFDM (CP-OFDM), discrete Fourier transform-spread-OFDM (DFT-S-OFDM); OFDM in which transform precoding is not performed; and OFDM in which transform precoding is performed, may be applied.

In SL in LTE, Mode 3 and Mode 4 are defined for SL resource allocation to the terminal 20. In Mode 3, transmission resources are dynamically allocated in accordance with downlink control information (DCI) transmitted from the base station 10 to the terminal 20. In Mode 3, semi persistent scheduling (SPS) can be also performed. In Mode 4, the terminal 20 autonomously selects transmission resources from a resource pool.

Note that a slot according to the embodiment of the present invention may be replaced with a symbol, a mini slot, a subframe, a radio frame, or a transmission time interval (TTI). Further, a cell according to the embodiment of the present invention may be replaced with a cell group, a carrier component, a BWP, a resource pool, a resource, a radio access technology (PAT), a system (including a wireless LAN), or the like.

Figure 2:
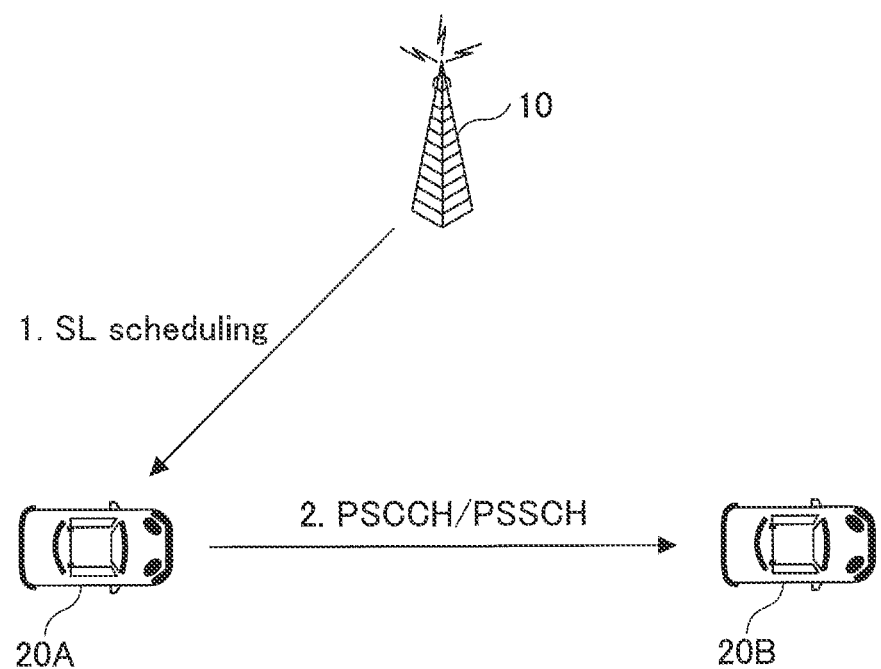
FIG. 2 is a diagram for explaining an example (1) of a V2X transmission mode.

FIG. 2 is a diagram for explaining an example (1) of a V2X transmission mode. In the transmission mode in the sidelink communication illustrated in FIG. 2, in step 1, the base station 10 transmits sidelink scheduling to a terminal 20A. Then, the terminal 20A transmits a physical sidelink control channel (PSCCH) and a physical sidelink shared channel (PSSCH) to a terminal 20B, based on received scheduling (step 2). The transmission mode in the sidelink communication illustrated in FIG. 2 may be referred to as sidelink transmission mode 3 in LTE. In the sidelink transmission mode 3 in LTE, Uu based-sidelink scheduling is performed. The Uu refers to a wireless interface between a universal terrestrial radio access network (UTRAN) and user equipment (UE). Note that the transmission mode in the sidelink communication illustrated in FIG. 2 may be referred to as sidelink transmission mode 1 in NR. Note that the transmission mode may be referred to as a resource allocation mode.

Figure 3:
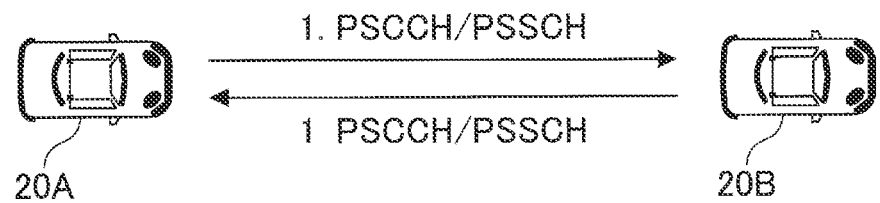
FIG. 3 is a diagram for explaining an example (2) of the V2X transmission mode.

FIG. 3 is a diagram for explaining an example (2) of the V2X transmission mode. In the transmission mode in the sidelink communication illustrated in FIG. 3, in step 1, the terminal 20A uses an autonomously selected resource to transmit the PSCCH and the PSSCH to the terminal 20B. Similarly, the terminal 20B uses an autonomously selected resource to transmit the PSCCH and the PSSCH to the terminal 20A (step 1). The transmission mode in the sidelink communication illustrated in FIG. 3 may be referred to as sidelink transmission mode 2a in NR. In sidelink transmission mode 2 in NR, the terminal 20 preforms resource selection by itself.

Figure 4:
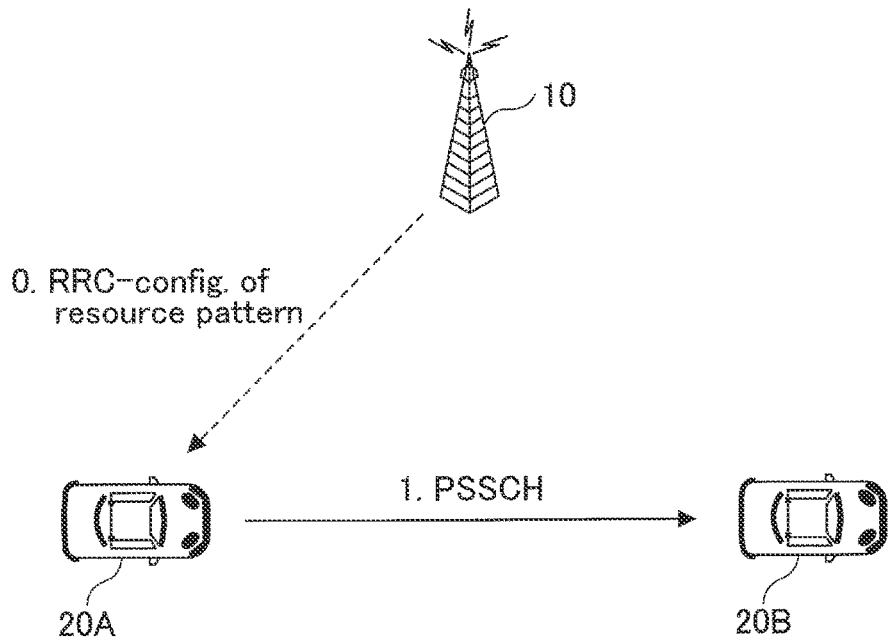
FIG. 4 is a diagram for explaining an example (3) of the V2X transmission mode.

FIG. 4 is a diagram for explaining an example (3) of the V2X transmission mode. In the transmission mode in the sidelink communication illustrated in FIG. 4, in step 0, a resource pattern in sidelink is set at the terminal 20A, by a radio resource control (RRC) configuration. Then, the terminal 20A transmits the PSSCH to the terminal 20B, based on the set resource pattern (step 1). The transmission mode in the sidelink communication illustrated in FIG. 4 may be referred to as sidelink transmission mode 2c in NR.

Figure 5:
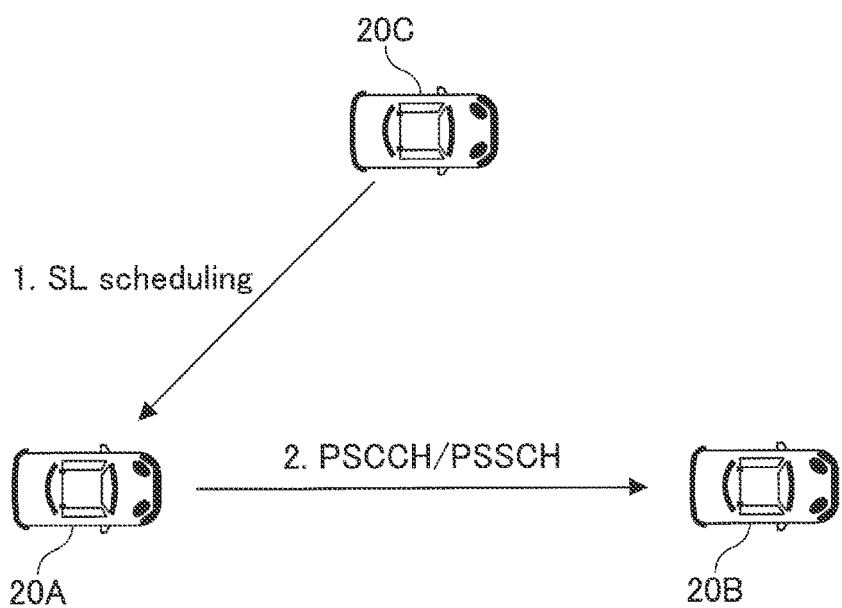
FIG. 5 is a diagram for explaining an example (4) of the V2X transmission mode.

FIG. 5 is a diagram for explaining an example (4) of the V2X transmission mode. In the transmission mode in the sidelink communication illustrated in FIG. 5, in step 1, a terminal 20C transmits sidelink scheduling to the terminal 20A via the PSCCH. Then, the terminal 20A transmits the PSSCH to the terminal 20B, based on received scheduling (step 2). The transmission mode in the sidelink communication illustrated in FIG. 5 may be referred to as sidelink transmission mode 2d in NR.

FIG. 6 is a diagram for explaining an example of the communication according to the embodiment of the present invention. A HARQ response in the case of the sidelink mode 1 in NR described in FIG. 2 is transmitted to the base station 10 by the transmitting-side terminal 20A as illustrated in FIG. 6.

In step 1, the base station 10 transmits the scheduling to the terminal 20A via a physical downlink control channel (PDCCH). In the next step 2, the terminal 20A transmits data to the terminal 20B via the PSCCH and/or the PSSCH. In the next step 3, the terminal 20B transmits a HARQ response to the terminal 20A via a physical sidelink feedback channel (PSFCH). In the next step 4, the terminal 20A transmits the HARQ response to the base station 10, via a physical uplink control channel (PUCCH) and/or a physical uplink shared channel (PUSCH). The resource arrangement for each channel illustrated in FIG. 6 is an example, and for example, each channel may be arranged within other slot or in other frequency domain.

Now, in the case of the sidelink transmission mode 1 in NR, a scheduling request (SR) or a buffer status report (BSR) to require a resource for retransmission in the HARQ, of the base station 10 is not supported in NR Rel-16. With the HARQ response being transmitted to the base station 10, the resource used in the retransmission is required. However, the resource used in the retransmission may not be provided by the base station 10. In this case, at the transmitting-side terminal 20A, a HARQ response operation on the PUCCH and/or the PUSCH is not clearly defined. In other words, the HARQ response operation via the PUCCH and/or the PUSCH, at the transmitting-side terminal 20A, which corresponds to the HARQ response via the PSFCH, is not clearly defined.

In this regard, the operation in which the transmitting-side terminal 20 relays, to the base station, the sidelink HARQ response that corresponds to the transmitted transport block and that is received by the transmitting-side terminal 20 via the PSFCH, via the PUCCH and/or the PUSCH, may be defined below. Note that in the present invention, the transport block may be replaced with the PSSCH, or be replaced with information transmitted via the PSSCH. According to the present embodiment, the operation of the HARQ response at the transmitting-side terminal 20 can be clearly defined and simplified.

For example, the transmitting-side terminal 20 may transmit, via the PUCCH and/or the PUSCH, information that is the same as information (ACK or NACK) of the HARQ response received via the PSFCH, to the base station 10.

Figure 7A:
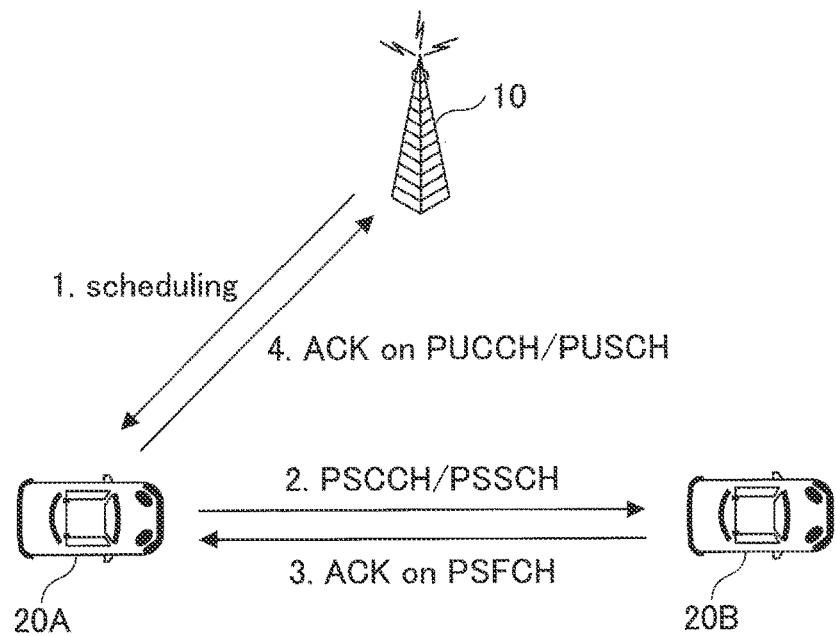
FIG. 7A is a diagram for explaining an example (1) of a first retransmission control according to the embodiment of the present invention.

FIG. 7A is a diagram for explaining an example (1) of a first retransmission control according to the embodiment of the present invention. As illustrated in FIG. 7A, when receiving, from the receiving-side terminal 20B, an ACK response corresponding the transmitted transport block via the PSFCH, the transmitting-side terminal 20A may forward the ACK response to the base station 10, via the PUCCH and/or the PUSCH.

Figure 7B:
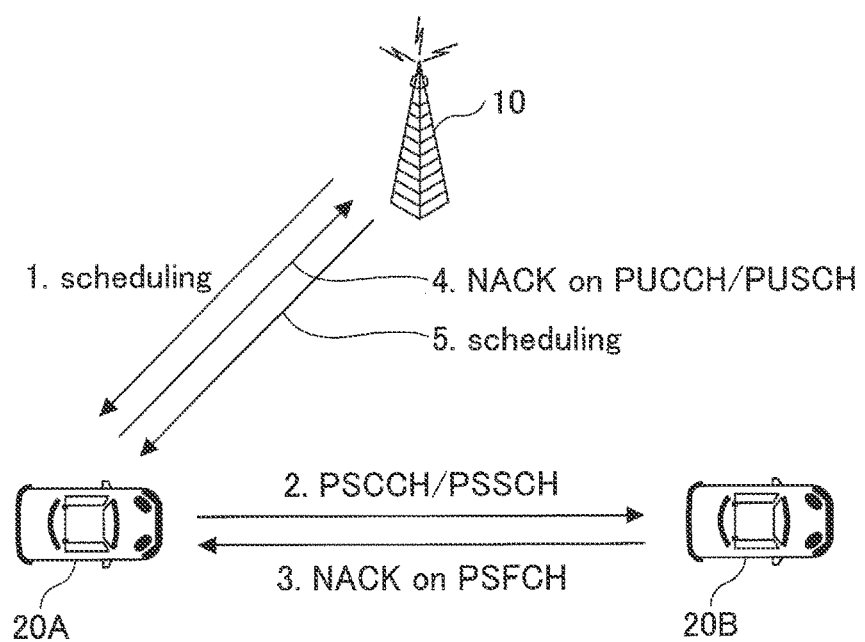
FIG. 7B is a diagram for explaining an example (2) of the first retransmission control according to the embodiment of the present invention.

FIG. 7B is a diagram for explaining an example (2) of the first retransmission control according to the embodiment of the present invention. As illustrated in FIG. 7B, when receiving, from the receiving-side terminal 20B, a NACK response corresponding to the transmitted transport block via the PSFCH, the transmitting-side terminal 20A may forward the NACK response to the base station 10, via the PUCCH and/or the PUSCH.

Figure 7C:
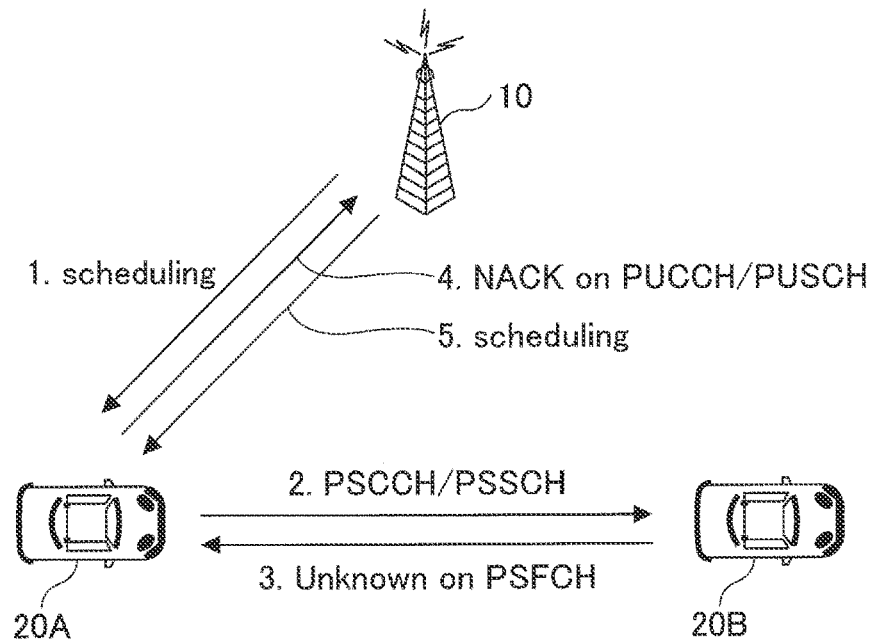
FIG. 7C is a diagram for explaining an example (3) of the first retransmission control according to the embodiment of the present invention.

FIG. 7C is a diagram for explaining an example (3) of the first retransmission control according to the embodiment of the present invention. As illustrated in FIG. 7C, when the HARQ response that corresponds to the transport block and that is received from the receiving-side terminal 20B, via the PSFCH, is "Unknown", the transmitting-side terminal 20A may forward the NACK response to the base station 10, via the PUCCH and/or the PUSCH. In the case of the operation as illustrated in FIG. 7C, the resource for retransmission is requested, and is transmitted from the base station 10 to the transmitting-side terminal 20A.

Where, the case where the HARQ response is "unknown", i.e., the HARQ response is not identified, may correspond to one situation among 1) to 4) below.

1) a case where the transmitting-side terminal 20 cannot detect the HARQ response corresponding to the transmitted transport block, via the PSFCH.
2) a case where the transmitting-side terminal 20 detects, via PSFCH, the HARQ response corresponding to the transmitted transport block, but cannot decode the HARQ response.
3) a case where the transmitting-side terminal 20 cannot transmit the transport block in a scheduled PSSCH resource.
4) in a case other than the 1) to 3) above, where the transmitting-side terminal 20 cannot detect the HARQ response corresponding to the transmitted transport block.

For example, after the transmitting-side terminal 20 determines whether to transmit an ACK or a NACK to the base station 10, the transmitting-side terminal 20 may transmit the HARQ response to the base station 10, via the PUCCH and/or the PUSCH. For example, a determination on whether to transmit the ACK or the NACK may be performed based on whether retransmission of the transport block is needed; whether a resource for retransmission is needed; or the like. According to the present embodiment, the operation of the HARQ response at the transmitting-side terminal 20 can be clearly defined. With the transmitting-side terminal 20 being able to change information of the HARQ response in accordance with a situation, an unnecessary retransmission resource can be prevented from being configured.

Figure 8A:
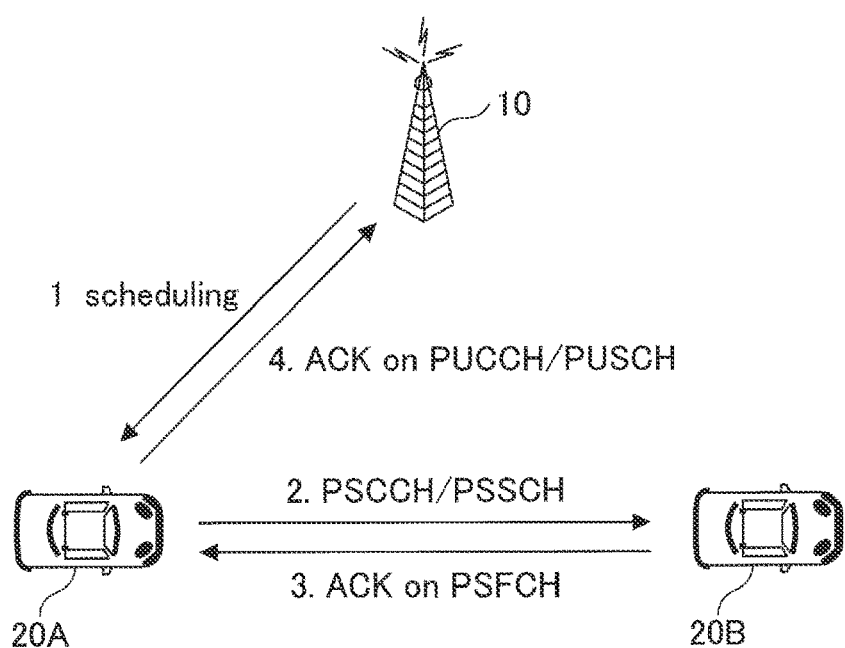
FIG. 8A is a diagram for explaining an example (1) of a second retransmission control according to the embodiment of the present invention.

FIG. 8A is a diagram for explaining an example (1) of a second retransmission control according to the embodiment of the present invention. As illustrated in FIG. 8A, when receiving, from the receiving-side terminal 20B, the ACK response corresponding to the transmitted transport block, via the PSFCH, the transmitting-side terminal 20A may forward the ACK response to the base station 10, via the PUCCH and/or the PUSCH. In other words, when receiving, from the receiving-side terminal 20B, the ACK response corresponding to transmitted transport block, via the PSFCH, the transmitting-side terminal 20A may prohibit the NACK response from being transmitted to the base station 10.

Figure 8B:
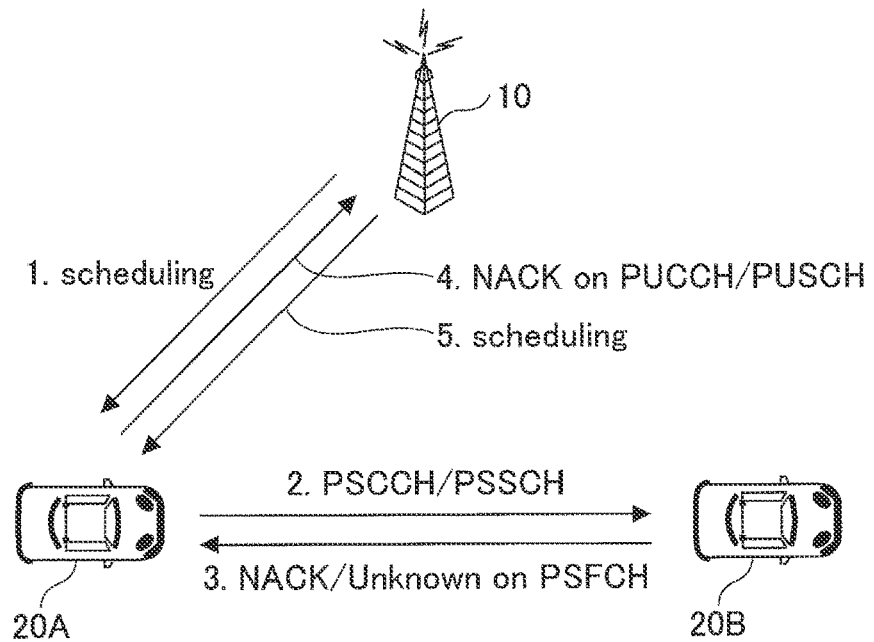
FIG. 8B is a diagram for explaining an example (2) of the second retransmission control according to the embodiment of the present invention.
Figure 8C:
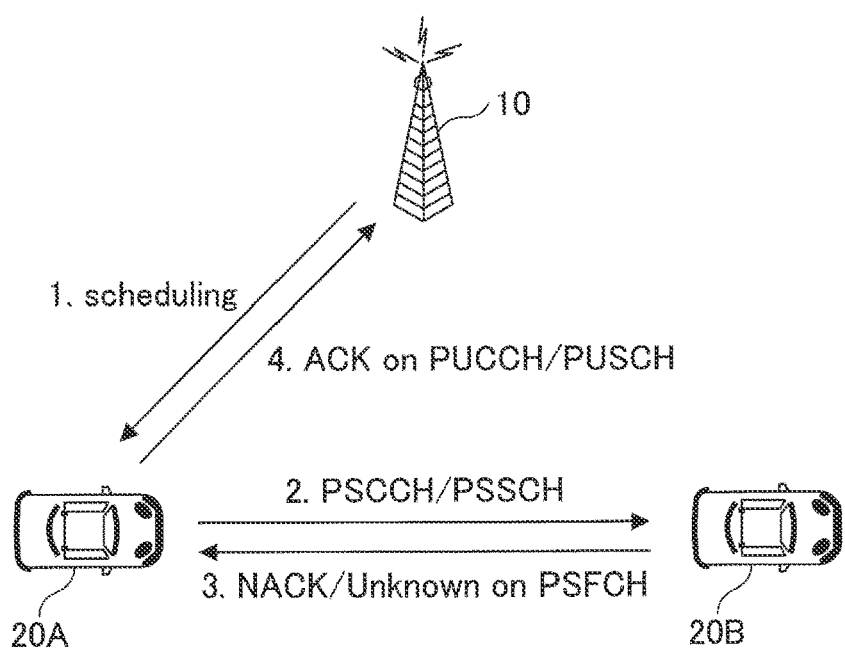
FIG. 8C is a diagram for explaining an example (3) of the second retransmission control according to the embodiment of the present invention.

FIG. 8B is a diagram for explaining an example (2) of a second retransmission control according to the embodiment of the present invention. FIG. 8C is a diagram for explaining an example (3) of the second retransmission control according to the embodiment of the present invention. As illustrated in FIG. 8B or FIG. 8C, when the transmitting-side terminal 20A receives, from the receiving-side terminal 20B, a NACK response corresponding to the transmitted transport block; or the "unknown", via the PSFCH, the transmitting-side terminal 20A may determine whether any of an ACK and a NACK is transmitted to the base station 10. For example, when information of the HARQ response is determined based on whether retransmission of the transport block is needed, in a case where retransmission is determined to be needed, the transmitting-side terminal 20A transmits the NACK response to the base station 10, and receives scheduling for retransmission, as illustrated in FIG. 8B. In a case where retransmission is determined not to be needed, the transmitting-side terminal 20A transmits a ACK response to the base station 10, as illustrated in FIG. 8C.

A method of determining whether to transmit the ACK or the NACK to the base station 10 may be combined by any of 1) to 6) indicated below, or combinations thereof.

1) Cast Type

For example, when receiving, from any receiving-side terminal 20B, the NACK response corresponding to group cast transmission or broad cast transmission via the PSFCH, the transmitting-side terminal 20A may determine that retransmission is not needed. Also, for example, when receiving, from any receiving-side terminal 20B, the NACK response corresponding to unicast transmission via the PSFCH, the transmitting-side terminal 20A may determine that retransmission is needed. For example, the transmitting-side terminal 20A may determine whether retransmission is needed according to implementation.

2) Latency Request

A threshold used in a latency request is given as x. The latency used in the transport block is required to be x or less, or be less than x. For example, when x is less than a predetermined value (or when x is a predetermined value or less), the transmitting-side terminal 20A may determine that an ACK is transmitted. For example, when a time elapsed after a packet is generated exceeds x (or when a time elapsed after a packet is generated is x or more), the transmitting-side terminal 20A may determine that an ACK is transmitted. Here, x may be configured or be pre-configured. Further, x may be determined taking into account an upper layer.

3) The Number of Retransmissions

The number of retransmissions of the transport block is given as y. For example, when y reaches a maximum number of retransmissions or exceeds a maximum number of retransmissions, the transmitting-side terminal 20A may determine that an ACK is transmitted. Here, y may be configured or be pre-configured. Further, y may be determined taking into account an upper layer.

4) Channel Busy Ratio (CBR)

For example, when the CBR is greater than a predetermined value, the transmitting-side terminal 20A may determine that an ACK is transmitted.

5) Sidelink Channel State Information (SL-CSI)

For example, when the SL-CSI is less than a predetermined value, the transmitting-side terminal 20A may determine that an ACK is transmitted.

6) Available Parameter that is Configured Taking into Account an Upper Layer

For example, the transmitting-side terminal 20A may determine whether any among an ACK and a NACK is transmitted based on the parameter configured taking into account the upper layer.

Note that when the transport block corresponding to the NACK response or "unknown" is determined to be retransmitted, the transmitting-side terminal 20A may transmit the NACK response to the base station 10, as a feedback to require a resource for retransmission.

Note that when the transport block corresponding to the NACK response or "unknown" is determined not to be retransmitted, the transmitting-side terminal 20A may transmit the ACK response to the base station 10, as a feedback to require a resource for retransmission.

For example, as the HARQ response via the PUCCH and/or the PUSCH, whether any among an ACK and NACK is transmitted may be determined in accordance with implementation of the transmitting-side terminal 20A. The retransmission control method described in FIG. 7A, 7B, or 7C may be combined with the retransmission control method described in FIG. 8A, 8B, or 8C, to be executed. Alternatively, which of retransmission control method is to be applied may be configured or indicated by: DCI; sidelink control information (SCI); or media access control-control element (MAC-CE).

According to the embodiment described above, after the HARQ response in the sidelink transmission is received, the operation of the feedback relating to the HARQ via the PUCCH and/or the PUSCH, at the terminal 20, can be clearly defined.

In other words, in the terminal-to-terminal direct communication, the retransmission control can be suitably performed.

(Apparatus Configuration)

Hereafter, an example of a functional configuration of the base station 10 and the terminal 20 that execute the processing and operation described above. The base station 10 and the terminal 20 each include the functions of carrying out the above embodiment. However, each of the base station 10 and the terminal 20 may include a portion of the functions described in the embodiment.

<Base Station 10>

Figure 9:
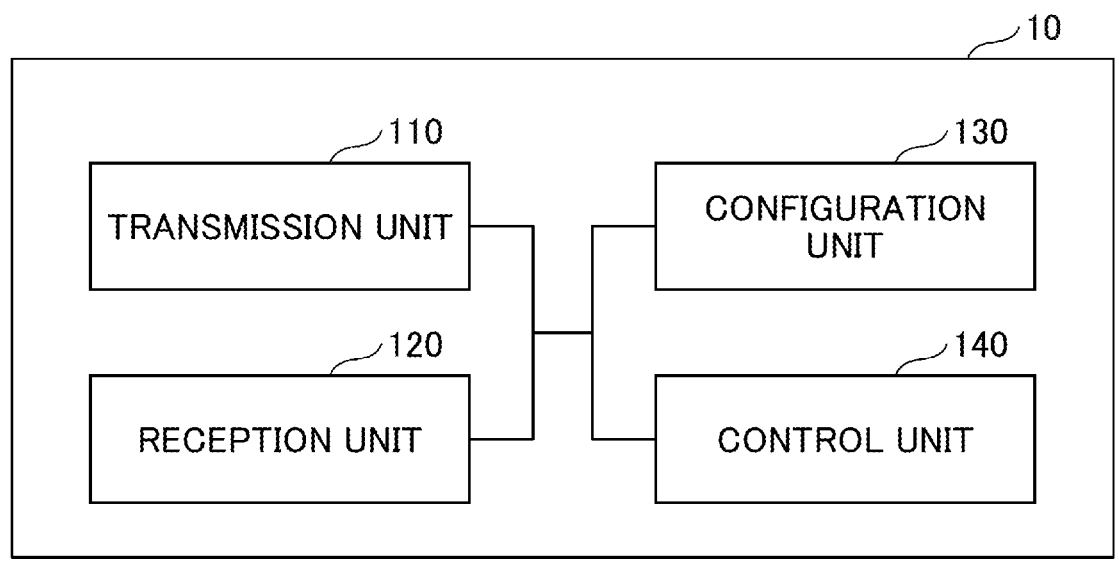
FIG. 9 is a diagram illustrating an example of a functional configuration of a base station 10 according to the embodiment of the present invention.

FIG. 9 is a diagram illustrating an example of a functional configuration of the base station 10. As illustrated in FIG. 9, the base station 10 includes a transmission unit 110, a reception unit 120, a configuration unit 130, and a control unit 140. The functional configuration illustrated in FIG. 9 is merely an example. Any name may be used for functional sections and functional units as long as the operation according to the embodiment of the present invention can be executed.

The transmission unit 110 includes a function of generating signals to be transmitted to the terminal 20, to transmit the signals by wireless. The reception unit 120 includes a function of receiving various signals transmitted from the terminal 20, to obtain information on, e.g., a higher layer, from the received signals. Also, the transmission unit 110 includes a function of transmitting, to the terminal 20, NR-PSS, NR-SSS, NR-PBCH, a DL/UL control signal, a DL reference signal, and the like.

The configuration unit 130 stores preset setting information and various setting information to be transmitted to the terminal 20, in a storage device, and retrieves the information from the storage device, as necessary. The contents of the setting information include, for example, information relating to D2D communication setting, and the like.

As described in the embodiment, the control unit 140 performs processing relating to setting of the D2D communication performed at the terminal 20. The control unit 140 transmits D2D scheduling to the terminal 20, via the transmission unit 110. The control unit 140 receives, from the terminal 20, information relating to the HARQ response in the D2D communication, via the reception unit 120. The transmission unit 110 includes a functional unit relating to transmission of signals used in the control unit 140, and the reception unit 120 may include a functional unit relating to reception of signals used in the control unit 140.

Figure 10:
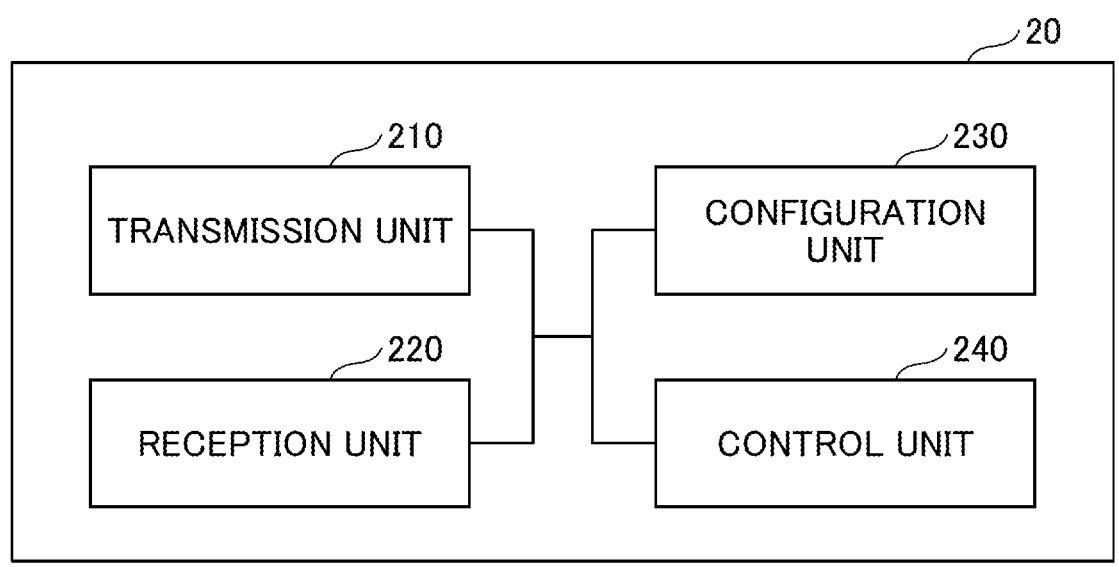
FIG. 10 is a diagram illustrating an example of a functional configuration of a terminal 20 according to the embodiment of the present invention.

<Terminal 20>
FIG. 10 is a diagram illustrating an example of a functional configuration of the terminal 20. As illustrated in FIG. 10, the terminal 20 includes a transmission unit 210, a reception unit 220, a configuration unit 230, and a control unit 240. The functional configuration illustrated in FIG. 10 is merely an example. Any name may be used for functional sections and functional units as long as the operation according to the embodiment of the present invention can be executed.

The transmission unit 210 generates a transmission signal from transmission data, and transmits the transmission signal by wireless. The reception unit 220 receives various signals by wireless, and obtains a higher layer signal from a received physical layer signal. The reception unit 220 has a function of receiving NR-PSS, NR-SSS, NR-PBCH, a DL/UL/SL control signal, a reference signal, or the like, which is transmitted by the base station 10. For example, in D2D communication, the transmission unit 210 transmits, to another terminal 20, the physical sidelink control channel (PSCCH); the physical sidelink shared channel (PSSCH); a physical sidelink discovery channel (PSDCH); a physical sidelink broadcast channel (PSBCH); or the like, and the reception unit 220 receives, from another terminal 20, the PSCCH, the PSSCH, the PSDCH, the PSBCH, or the like.

The configuration unit 230 stores, in a storage device, various setting information received from the base station 10 or the terminal 20, through the reception unit 220, and retrieves the information from the storage device, as necessary. The configuration unit 230 also stores preset setting information. The contents of the setting information include, for example, information relating to D2D communication setting, and the like.

As described in the embodiment, the control unit 240 controls the D2D communication with another terminal 20. The control unit 240 performs processing relating to the HARQ in the D2D communication. The control unit 240 transmits, to the base station 10, information relating to the HARQ response in the D2D communication with another terminal 20, scheduled by the base station 10. The control unit 240 may perform scheduling of the D2D communication with another terminal 20. The transmission unit 210 includes a functional unit relating to transmission of signals used in the control unit 240, and the reception unit 220 may include a functional unit relating to reception of signals used in the control unit 240.

(Hardware Configuration)
The block diagrams (FIGS. 9 and 10) described in the above embodiment illustrate the blocks each showing a functional unit. The functional blocks (configuring units) are implemented by any combination of at least any one of hardware and software. A method of implementing each functional block is not particularly limited. In other words, each functional block may be implemented using one device that is physically or logically coupled, or be implemented using two or more devices that are physically or logically separated and that are directly or indirectly connected (for example, by wired, wireless, or the like). The function block may be implemented by a combination of software and either of the one device or the plurality of devices.

The functions include determining, deciding, judging, computing, calculating, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, and the like, but are not limited thereto. For example, a functional block (configuring unit) corresponding to a transmission function is referred to as a transmission unit or a transmitter. In any case, as described above, an implementation method is not particularly limited.

Figure 11:
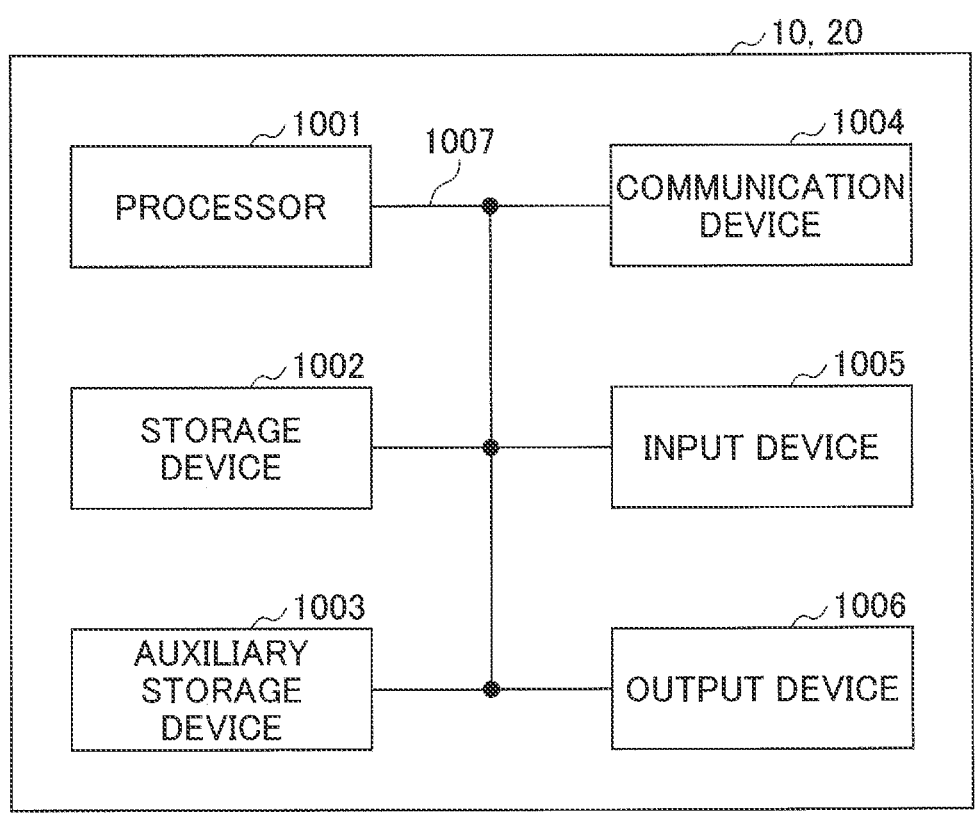
FIG. 11 is a diagram illustrating an example of a hardware configuration of the base station 10 or the terminal 20 according to the embodiment of the present invention.

For example, the base station 10, the terminal 20, and the like according to one embodiment of the present disclosure may each function as a computer that executes a wireless communication method in the present disclosure. FIG. 11 is a diagram illustrating an example of a hardware configuration of each of the base station 10 and the terminal 20 according to one embodiment of the present disclosure. Each of the base station 10 and the terminal 20 may be physically configured as a computer device including a processor 1001, a storage device 1002, an auxiliary storage device 1003, a communication device 1004, an input device 1005, an output device 1006, a bus 1007, and the like.

Note that in the following description, the term "device" can be replaced with a circuit, a device, a unit, or the like. The hardware configuration of each of the base station 10 and the terminal 20 may be configured to include one or more devices illustrated in the drawings, or may be configured without including some devices.

Each function of the base station 10 and the terminal 20 is implemented such that predetermined software (program) is read on hardware such as the processor 1001 and the storage device 1002, and such that the processor 1001 performs an operation to control the communication by the communication device 1004, or such that the processor 1001 controls at least one of reading and writing of data in the storage device 1002 and the auxiliary storage device 1003.

For example, the processor 1001 executes an operating system and controls the entire computer. The processor 1001 may be configured with a central processing unit (CPU) including an interface with a peripheral device; a control device; an arithmetic device; a register; and the like. For example, the control unit 140, the control unit 240, and the like described above may be implemented by the processor 1001.

Further, the processor 1001 reads a program (program code), a software module, or data, etc. from at least one of the auxiliary storage device 1003 and the communication device 1004, to the storage device 1002, and executes various processes according to them. A program that causes a computer to execute at least a portion of the operation described in the above embodiment is used as the above program. For example, the control unit 140 of the base station 10 illustrated in FIG. 9 may be implemented by a control program that is stored in the storage device 1002, and that is executed by the processor 1001. Further, for example, the control unit 240 of the terminal 20 illustrated in FIG. 10 may be implemented by a control program that is stored in the storage device 1002 and that is executed by the processor 1001. The case where the various processes are executed by the one processor 1001 has been described, but the various processes may be performed simultaneously or sequentially by two or more processors 1001. The processor 1001 may be implemented by one or more chips. Note that the program may be transmitted using a network via an electric communication line.

The storage device 1002 is a computer readable recording medium and may be configured with at least one among a read only memory (ROM), an erasable programmable ROM (EPROM), an electrically erasable programmable ROM (EEPROM), a random access memory (RAM), and the like. The storage device 1002 may be also referred to as a register, a cache, a main memory (main storage device), or the like. The storage device 1002 can store programs (program codes), software modules, or the like, which is executable for carrying out the communication method according to one embodiment of the present disclosure.

The auxiliary storage device 1003 is a computer-readable recording medium and may be configured with, for example, at least one among an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage medium may be, for example, a database, a server, or any other appropriate medium, the database including at least one of the storage device 1002 and the auxiliary storage device 1003.

The communication device 1004 is hardware (a transceiving device) for performing communication between computers via at least one of a wired network and a wireless network, and is also referred to as, for example, a network device, a network controller, a network card, a communication module, or the like. The communication device 1004 may include a high-frequency switch, a duplexer, a filter, a frequency synthesizer, or the like in order to achieve at least one of frequency division duplex (FDD) and time division duplex (TDD). For example, a transceiving antenna, an amplifying unit, a transmitting and reception unit, a transmission line interface, or the like may be implemented by the communication device 1004. The transmitting and reception unit may be implemented by a transmission unit and a reception unit being physically or logically separated.

The input device 1005 is an input device that receives an input from the outside (such as a keyboard, a mouse, a microphone, a switch, a button, a sensor, or the like). The output device 1006 is an output device that performs output to the outside (for example, a display, a speaker, an LED lamp, or the like). Note that the input device 1005 and the output device 1006 may be integrally configured (for example, a touch panel).

The devices such as the processor 1001 and the storage device 1002 are connected via the bus 1007 for communicating information. The bus 1007 may be configured with a single bus or be configured with a bus that differs with respect to devices.

Further, each of the base station 10 and the terminal 20 may be configured to include hardware such as a microprocessor, a digital signal processor (DSP), an application specific integrated circuit (ASIC), a programmable logic device (PLD), or a field programmable gate array (FPGA), or, all or some of the functional blocks may be implemented by hardware. For example, the processor 1001 may be implemented using at least one of these pieces of hardware.

SUMMARY OF EMBODIMENTS

As described above, according to the embodiment of the present invention, a terminal is provided, including a reception unit configured to receive information for scheduling a resource used in terminal-to-terminal direct communication, from a base station; and a transmission unit configured to transmit a signal to another terminal, by using the resource. The reception unit is configured to receive, from the another terminal, a response related to a retransmission control corresponding to the signal, and the terminal further includes
a control unit configured to select either of information including a positive response or information including a negative response, based on the response related to the retransmission control. The transmission unit is configured to transmit the selected information to the base station.

In such a configuration, with a feedback in the HARQ via the PUCCH and/or PUSCH, the terminal 20 can require a resource for retransmission used in the HARQ in sidelink communication, of the base station 10. In other words, in terminal-to-terminal direct communication, a retransmission control can be suitably performed.

The control unit may be configured to, when the response related to the retransmission control is the positive response, select the information including the positive response, and select the information including the negative response when the response related to the retransmission control is the negative response. In such a configuration, in terminal-to-terminal direct communication, a resource for retransmission used in the HARQ in sidelink communication can be required of the base station 10.

When the response related to the retransmission control is unknown and the response related to the retransmission control cannot be detected; when the response related to the retransmission cannot be decoded; or when the signal cannot be transmitted using the resource, the control unit may be configured to select the information including the negative response. In such a configuration, in terminal-to-terminal direct communication, a resource for retransmission used in the HARQ in sidelink communication can be requested to the base station 10.

When the response related to the retransmission control is the negative response or is unknown, the control unit may be configured to select any of the information including the positive response and the information including the negative response, based on a cast type; a latency request; the number of retransmissions; a channel busy ratio (CBR); or sidelink-channel state information (SL-CSI). In such a configuration, the terminal 20 can determine whether to require a resource for retransmission used in the HARQ of the base station 10, based on a parameter in sidelink communication.

The control unit may be configured to select the information including the positive response, when the response related to the retransmission control is the negative response or is unknown and the cast type is a group cast or a multicast; when a threshold for the latency request is less than a predetermined value; when latency related to the signal exceeds the threshold for the latency request; when the number of retransmissions corresponding to the signal exceeds a maximum number of retransmissions; the CBR is greater than a predetermined value; or the SL-CSI is less than a predetermined value. In such a configuration, when less-needed retransmission is determined based a parameter in sidelink communication, the terminal 20 can determine not to require a resource for retransmission of the base station 10.

According to the embodiment of the present invention, a communication method is provided, including receiving information for scheduling a resource used in terminal-to-terminal direct communication, from a base station; and transmitting a signal to another terminal, by using the resource. The receiving includes receiving, from the another terminal, a response related to a retransmission control corresponding to the signal, and the method further includes selecting one of information including a positive response and information including a negative response, based on the response related to the retransmission control. The transmitting includes transmitting the selected information to the base station.

In such a configuration, with a feedback in the HARQ via the PUCCH and/or PUSCH, the terminal 20 can require a resource for retransmission used in the HARQ in sidelink communication, of the base station 10. In other words, in terminal-to-terminal direct communication, a retransmission control can be suitably performed.

Supplement to Embodiment

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for description, but the numerical values are merely examples, and any suitable values may be used unless otherwise stated. The classification of items in the above description is not essential to the present invention, matters described in two or more items may be combined and used as necessary, and a matter described in one item may be applied to a matter described in another item (unless there is a contradiction). The boundary between functional units or processing units in a functional block diagram does not necessarily correspond to the boundary between physical parts. The operations of a plurality of functional units may be performed physically by one component, or an operation of one functional unit may be performed physically by a plurality of parts. In the processing procedures described in the embodiment, the order of processes may be changed as long as there is no inconsistency. For the sake of convenience of the process description, the base station 10 and the terminal 20 have been described using the functional block diagrams, but such apparatuses may be implemented by hardware, software, or a combination thereof. The software executed by the processor of the base station 10 according to the embodiment of the present invention, and the software executed by the processor of the terminal 20 according to the embodiment of the present invention, may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

The notification of information is not limited to the aspect/embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (MIB (Master Information Block), SIB (System Information Block)), other signals, or combinations thereof. The RRC signaling may be referred to as an RRC message and may be, for example, an RRC connection setup message, an RRC connection reconfiguration message or the like.

Each aspect/embodiment described in the present disclosure may be applied to at least one from among LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), a system using other proper system, and next-generation systems that are extended based on these systems. Also, a combination of multiple systems (for example, a combination of at least one of LTE and LTE-A, and 5G, or the like) may be applied.

In each aspect/embodiment described in the specification, the order of the procedure, the sequence, the flowchart, and the like may be changed as long as there is no contraction therebetween. For example, for the method described in the present disclosure, elements of various steps are presented in the illustrative order and are not limited to the specific order as presented.

In the specification, in some cases, the specific operation performed by the base station 10 may be also performed by an upper node of the base station. In a network that includes one or more network nodes including the base station 10, it is apparent that various operations performed for communication with the terminal 20 can be performed by at least one from among the base station 10 and another network node (for example, MME, S-GW, or the like is considered, but such a node is not limited thereto) other than the base station 10. In the above example, one network node is used as another network node other than the base station 10. However, a plurality of other network nodes (for example, MME and S-GW) may be combined.

Information, a signal, or the like described in the present disclosure may be output from an upper layer (or a lower layer) to a lower layer (or an upper layer). Information, a signal, or the like described in the present disclosure may be input and output via a plurality of network nodes.

Input and output information, and the like may be stored in a specific place (for example, a memory) or may be managed using a management table. Input and output information, and the like may be overwritten, updated, or additionally written. Output information, and the like may be deleted. Input information, and the like may be transmitted to another device.

The determination in the present disclosure may be performed in accordance with a value (0 or 1) expressed by one bit, be performed with a Boolean value (true or false), or be performed based on a comparison between numerical values (for example, a comparison with a predetermined value).

Software should be interpreted widely to mean a command; a command set; a code; a code segment; a program code; a program; a subprogram; a software module; an application; a software application; a software package; a routine; a subroutine; an object; an executable file; an execution thread; a procedure; a function; and the like, regardless of whether software is referred to as software, firmware, middleware, a microcode, a hardware description language, or, is referred to by any other name.

Further, software, commands, information, and the like may be transmitted and received via a transmission medium. For example, when software is transmitted from a web site, a server, or any other remote source, by using at least one from among a wired technology (such as a coaxial cable, a fiber optic cable, a twisted pair, or a digital subscriber line (DSL)) and a radio technology (such as infrared rays or a microwave), at least one of the wired technology and the radio technology is defined in the transmission medium.

Information, signals, and the like described in the present disclosure may be expressed using any of a variety of different techniques. For example, data, instructions, commands, information, signals, bits, symbols, chips, and the like which are mentioned throughout the description may be expressed by voltages, currents, electromagnetic waves, magnetic particles, optical fields, photons, or any combination thereof.

Note that the terms described in the present disclosure and terms necessary for understanding the present disclosure may be replaced with terms having the same or similar meanings. For example, at least one of a channel and a symbol may be a signal (signaling). Further, a signal may be a message. Further, a component carrier (CC) may be referred to as a carrier frequency, a cell, a frequency carrier, or the like.

The terms "system" and "network" used in the present disclosure are used interchangeably.

Further, information, parameters, and the like described in the present disclosure may be expressed using an absolute value, be expressed using a relative value from a predetermined value, or be expressed using corresponding other information. For example, the radio resource may be indicated by an index.

The names used for the above parameters are not limited in any respect. Further, mathematical formulas or the like using the parameters may be different from those explicitly disclosed in the present disclosure. Since various channels (for example, a PUCCH, a PDCCH, and the like) and information elements can be identified by any suitable names, various names for the various channels; and the information elements are not limited in any respect.

In the present disclosure, the terms "base station (BS)," "radio base station," "base station," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base station may also be referred to by the term such as a macrocell, a small cell, a femtocell, or a picocell.

The base station can accommodate one or more (for example, three) cells. In a case in which the base station accommodates a plurality of cells, the entire coverage area of the base station can be partitioned into a plurality of smaller areas, and each smaller area can provide a communication service through a base station subsystem (for example, a small indoor base station (Remote Radio Head (RRH)). The term "cell" or "sector" refers to all or some of the coverage area of at least one of the base station and the base station subsystem that provides a communication service in the coverage.

In the present disclosure, the terms "mobile station (MS)," "user terminal," "user equipment (UE)," "terminal," and the like can be used interchangeably.

The mobile station may be also referred to as, by those skilled in the art, a subscriber station; a mobile unit; a subscriber unit; a wireless unit; a remote unit; a mobile device; a wireless device; a wireless communication device; a remote device; a mobile subscriber station; an access terminal; a mobile terminal; a wireless terminal; a remote terminal; a handset; a user agent; a mobile client; or client, or be also referred to by some other suitable terms.

At least one of the base station and the mobile station may be also referred to as a transmitting device, a receiving device, a communication device, or the like. Note that at least one of the base station and the mobile station may include a device installed in a mobile body, a mobile body itself, or the like. The moving body may be a vehicle (for example, a car, an airplane, or the like), a moving body that moves unmanned (for example, a drone, an autonomous car or the like), or a robot (manned type or unmanned type). Note that at least one of the base station and the mobile station includes a device that does not necessarily move during a communication operation. For example, at least one of the base station and the mobile station may be an IoT (Internet of things) device such as a sensor.

Further, the base station in the present disclosure may be replaced with a user terminal. For example, in each aspect/embodiment of the present disclosure, a configuration in which communication between the base station and the user terminal is replaced with communication between a plurality of terminals 20 (for example, which may be referred to as device-to-device (D2D), vehicle-to-everything (V2X)), or the like) may be applied. In this case, the terminal 20 may have the functions of the base station 10 described above. Further, the terms "uplink" and "downlink", etc. may be each replaced with a term (for example, "side") corresponding to inter-terminal communication. For example, an uplink channel, a downlink channel, or the like may be replaced with a side channel.

Similarly, the user terminal in the present disclosure may be replaced with the base station. In this case, the base station may have the functions of the above user terminal.

The term "determining" used in the present disclosure may cover a wide variety of actions. For example, "determining" may include, for example, events, etc., in which events such as judging, calculating, computing, processing, deriving, investigating, looking up, search, and inquiry (for example, search using a table, a database, or another data structure), or ascertaining are regarded as "determining." Further, "determining" may include, for example, events, etc., in which events such as receiving (for example, receiving information), transmitting (for example, transmitting information), input, output, or accessing (for example, accessing data in a memory) are regarded as "determining." Further, "determining" may include, for example, events in which events such as resolving, selecting, choosing, establishing, or comparing, etc. are regarded as "determining." In other words, "determining" may include events in which any operation is regarded as "determining." Further, "determining" may be replaced with "assuming," "expecting," "considering," or the like.

The term "connected," "coupled," or any modification thereof means any direct or indirect connection or coupling between two or more elements, and can cover the presence of one or more intermediate elements between two elements that are "connected" or "coupled" with each other. The coupling or the connection between the elements may be physical, logical, or a combination thereof. For example, "connection" may be replaced with "access." When used in the present disclosure, two elements can be considered to be "connected" or "coupled" with each other, by using at least one of: one or more electric wires; cables; and a printed electrical connection, or, by, as a non-limiting and non-exhaustive example, using electromagnetic energy that has a wavelength in radio frequency domain; a microwave region; or a light (both visible and invisible) region, etc.

A reference signal may be abbreviated as RS (reference signal) and may be referred to as a pilot, depending on a standard to be applied.

A phrase "based on" used in the present disclosure is not limited to "based on only" unless otherwise stated. In other words, the phrase "based on" means both of "based on only" and "based on at least."

Any reference to an element expressed using a designation such as "first," "second," or the like used in the present disclosure does not generally restrict quantities or an order of those elements. Such designations may be used in the present disclosure as a convenient method of distinguishing two or more elements. Thus, reference to the first and second elements does not mean that only two elements can be adopted, or that the first element must precede the second element in a certain form.

Further, "means" in the configuration of each of the above apparatuses may be replaced with "unit," "circuit," "device," or the like.

In the present disclosure, when "include," "including," and variations thereof are used, these terms are intended to be comprehensive, similarly to a term "equipped with (comprising)." Further, the term "or" used in the present disclosure is intended not to be an exclusive disjunction.

A radio frame may include one or more frames in the time domain. In the time domain, each of one or more frames may be referred to as a subframe. The subframe may further include one or more slots in the time domain. The subframe may have a fixed time length (for example, 1 ms) that is not in accordance with numerology.

The numerology may be a communication parameter applied to at least one of transmission and reception of a certain signal or channel. The numerology may indicate at least one from among, for example, SCS (SubCarrier Spacing), a bandwidth, a symbol length, a cyclic prefix length, a TTI (Transmission Time Interval), the number of symbols per TTI, a radio frame configuration, a specific filtering process performed in the frequency domain by a transceiver, a specific windowing process performed in the time domain by a transceiver, and the like.

The slot may include one or more symbols (OFDM (Orthogonal Frequency Division Multiplexing) symbols, SC-FDMA (Single Carrier Frequency Division Multiple Access) symbols, or the like) in the time domain. The slot may be a time unit based on the numerology.

The slot may include a plurality of mini-slots. Each mini-slot may include one or more symbols in the time domain. The mini-slot may be referred to as a sub-slot. The mini-slot may include a number of symbols smaller than a slot. The PDSCH (or PUSCH) transmitted by time unit greater than the mini-slot may be referred to as the PDSCH (or PUSCH) mapping type A. The PDSCH (or PUSCH) transmitted using the mini-slot may be referred to as the PDSCH (or PUSCH) mapping type B.

A radio frame, a subframe, a slot, a mini-slot, and a symbol each indicate a time unit in transmitting a signal. The radio frame, the subframe, the slot, the mini-slot, and the symbol may be each referred to by a corresponding other name.

For example, one subframe may be referred to as a transmission time interval (TTI), a plurality of consecutive subframes may be referred to as a TTI, or one slot or one mini-slot may be referred to as a TTI. In other words, at least one of the subframe and the TTI may be a subframe (1 ms) in existing LTE, include a period (for example, 1 to 13 symbols) shorter than 1 ms, or include a period longer than 1 ms. Note that a unit expressed as the TTI may be referred to as a slot, a mini-slot, or the like, instead of the subframe.

Here, for example, the TTI refers to a minimum time unit for scheduling in wireless communication. For example, in an LTE system, the base station performs scheduling in which a radio resource (a frequency bandwidth, a transmission power, or the like that can be used at each terminal 20) is allocated to each terminal 20, by TTI unit. Note that the definition of the TTI is not limited to the above manner.

The TTI may be used as a transmission time unit for a channel coded data packet (transport block), a code block, a code word, or the like, or be used as a processing unit for scheduling, link adaptation, or the like. Note that when a TTI is given, a time interval (for example, the number of symbols) at which a transport block, a code block, a code word, or the like is actually mapped may be shorter than the TTI.

Note that when one slot or one mini-slot is referred to as the TTI, one or more TTIs (that is, one or more slots, or, one or more mini-slots) may be used as a minimum time unit for scheduling. Further, the number of slots (the number of mini-slots) that constitute the minimum time unit for scheduling may be controlled.

A TTI having a time length of 1 ms may be referred to as a common TTI (TTI in LTE Rel. 8-12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini-slot, a sub-slot, a slot, or the like.

Note that the long TTI (for example, a common TTI, a subframe, or the like) may be replaced with a TTI having a time length exceeding 1 ms, and the short TTI (for example, a reduced TTI, or the like) may be replaced with a TTI having a TTI length that is shorter than a TTI length of the long TTI, and that is equal to or longer than 1 ms.

The resource block (RB) is used as a resource allocation unit in time domain and frequency domain, and may include one or more consecutive subcarriers in the frequency domain. The number of subcarriers included in the RB may be same, regardless of a numerology, and be, for example, 12. The number of subcarriers included in the RB may be determined based on the numerology.

Further, a time domain of the RB may include one or more symbols, and may have a length of one slot, one mini-slot, one subframe, or one TTI. One TTI, one subframe, or the like may be configured with one or more resource blocks.

Note that one or more RBs may be referred to as a physical resource block (PRB), a sub-carrier group (SCG), a resource element group (REG), a PRB pair, an RB pair, or the like.

Further, the resource block may be configured with one or more resource elements (REs). For example, one RE may be a radio resource domain of one subcarrier and one symbol.

A bandwidth part (BWP) (which may be referred to as a partial bandwidth, or the like) may indicate a subset of consecutive common resource blocks (RBs) for certain numerology, on a certain carrier. Where, the common RB may be specified by an RB index with reference to a common reference point in a given carrier. The PRB is defined by a certain BWP, and may be numbered in the BWP.

The BWP may include a BWP (UL BWP) for UL and a BWP (DL BWP) for DL. For UE, one or more BWPs may be configured in one carrier.

At least one of configured BWPs may be active, and UE may not be assumed to transmit and receive a predetermined signal/channel, except for the active BWP. Note that the "cell," the "carrier," or the like in the present disclosure may be replaced with the "BWP."

The structures of the above radio frame, the subframe, the slot, the mini-slot, the symbol, and the like are merely examples. For example, the configurations, such as the number of subframes included in a radio frame; the number of slots per subframe or radio frame; the number of mini-slots included in a slot; the number of each of symbols and RBs, the symbols being included in a slot or a mini-slot; the number of sub-carriers included in an RB; the number of symbols in a TTI; a symbol length; a cyclic prefix (CP) length; and the like, can be variously changed.

In the present disclosure, for example, when an article such as "a," "an," or "the" in English is added by translating, the present disclosure may include a case in which a noun following the article is in the plural.

In the present disclosure, the expression "A and B are different" may mean "A and B are different from each other." Note that the expression may mean "each of A and B is different from C." Terms such as "separated," "coupled," or the like may be also interpreted, as is the case with "different."

Each aspect/embodiment described in the present disclosure may be used alone or in combination, or be switched according to the execution. Further, notification of predetermined information (for example, notification of "being X") is not limited to being performed explicitly, and may be performed implicitly (for example, the predetermined information is not indicated).

Note that in the present disclosure, the HARQ response is an example of a response related to a retransmission control. The ACK is an example of a positive response. The NACK is an example of a negative response.

The present disclosure has been described above in detail. It would be apparent to those skilled in the art that the present disclosure is not limited to the embodiment described in the present disclosure.

Modifications and changes of the present disclosure can be made without departing from a spirit and scope of the present disclosure set forth in the claims. Therefore, the description of the present disclosure is provided for illustrative purposes, and is not intended to limit the present disclosure.

REFERENCE SIGNS LIST

10 BASE STATION
110 TRANSMISSION UNIT
120 RECEPTION UNIT
130 CONFIGURATION UNIT
140 CONTROL UNIT
20 TERMINAL
210 TRANSMISSION UNIT
220 RECEPTION UNIT
230 CONFIGURATION UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
a transmitter configured to transmit a transport block to another terminal via a Physical Sidelink Shared Channel (PSSCH);
a receiver configured to receive a sidelink Hybrid Automatic Repeat Request (HARQ) response from the another terminal via a Physical Sidelink Feedback Channel (PSFCH); and
a processor configured to set a value of information to a same value as a value of the sidelink HARQ response, the value of the information being to be transmitted to a base station,
wherein the transmitter is configured to transmit the value of the information to the base station, and
wherein, in a case where a sidelink HARQ response corresponding to the transport block is undetectable in the PSFCH, the processor is configured to set the value of the information to NACK.

2. The terminal according to claim 1, wherein, in a case where a transport block is unable to be transmitted in a resource of the PSSCH, the processor is configured to set the value of the information to NACK.

3. A communication method of a terminal, the communication method comprising:
transmitting a transport block to another terminal via a Physical Sidelink Shared Channel (PSSCH);
receiving a sidelink Hybrid Automatic Repeat Request (HARQ) response from the another terminal via a Physical Sidelink Feedback Channel (PSFCH); and
setting a value of information to a same value as a value of the sidelink HARQ response, the value of the information being to be transmitted to a base station,
wherein the transmitting transmits the value of the information to the base station, and
wherein, in a case where a sidelink HARQ response corresponding to the transport block is undetectable in the PSFCH, the setting sets the value of the information to NACK.

* * * * *